(12) United States Patent
Dong

(10) Patent No.: US 12,438,643 B2
(45) Date of Patent: Oct. 7, 2025

(54) UNLICENSED FREQUENCY BAND FEEDBACK METHOD, UNLICENSED FREQUENCY BAND FEEDBACK APPARATUS, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 460 days.

(21) Appl. No.: 17/916,559

(22) PCT Filed: Apr. 7, 2020

(86) PCT No.: PCT/CN2020/083578
§ 371 (c)(1),
(2) Date: Sep. 30, 2022

(87) PCT Pub. No.: WO2021/203247
PCT Pub. Date: Oct. 14, 2021

(65) Prior Publication Data
US 2023/0155735 A1    May 18, 2023

(51) Int. Cl.
*H04L 1/1812* (2023.01)
*H04W 72/1268* (2023.01)
*H04W 72/23* (2023.01)
*H04W 72/56* (2023.01)

(52) U.S. Cl.
CPC ....... *H04L 1/1812* (2013.01); *H04W 72/1268* (2013.01); *H04W 72/23* (2023.01); *H04W 72/56* (2023.01)

(58) Field of Classification Search
CPC ............... H04L 1/1812; H04L 1/1854; H04W 72/1268; H04W 72/23; H04W 72/56
See application file for complete search history.

(56) References Cited

U.S. PATENT DOCUMENTS

| | | | |
|---|---|---|---|
| 10,187,805 B2* | 1/2019 | Zhou | H04W 72/04 |
| 11,224,056 B2* | 1/2022 | Chakraborty | H04W 72/1268 |
| 11,290,988 B2* | 3/2022 | Zhang | H04W 76/27 |

(Continued)

FOREIGN PATENT DOCUMENTS

| | | |
|---|---|---|
| CN | 107295664 A | 10/2017 |
| CN | 109155694 A | 1/2019 |

(Continued)

OTHER PUBLICATIONS

Intel Corporation, "Enhancements to HARQ for NR-unlicensed", 3GPP TSG RAN WG1 Meeting #99, R1-1912199, Reno, USA, Nov. 18-22, 2019, (13p).

(Continued)

*Primary Examiner* — Eric Nowlin
(74) *Attorney, Agent, or Firm* — Arch & Lake LLP; Hao Tan; Shen Wang

(57) ABSTRACT

An unlicensed frequency band feedback method is provided. The method may be performed by a network device and may include: determining that a high-priority physical uplink shared channel is received; and transmitting downlink feedback information that feeds back hybrid automatic repeat request acknowledgement information for the high-priority physical uplink shared channel.

14 Claims, 6 Drawing Sheets

(56) References Cited

U.S. PATENT DOCUMENTS

| | | | | |
|---|---|---|---|---|
| 11,330,624 | B2 * | 5/2022 | Wang | H04W 74/0808 |
| 11,632,195 | B2 * | 4/2023 | Salem | H04L 1/1854 |
| | | | | 370/329 |
| 12,150,170 | B2 * | 11/2024 | Wang | H04W 72/1268 |
| 2017/0311173 | A1 * | 10/2017 | Zhou | H04W 72/51 |
| 2019/0074935 | A1 | 3/2019 | Babaei et al. | |
| 2019/0246391 | A1 * | 8/2019 | Zhang | H04L 1/1812 |
| 2019/0327755 | A1 | 10/2019 | Xiong et al. | |
| 2019/0349965 | A1 * | 11/2019 | Chakraborty | H04W 72/21 |
| 2020/0037359 | A1 * | 1/2020 | Wang | H04W 72/23 |
| 2020/0053748 | A1 | 2/2020 | Hosseini et al. | |
| 2020/0221310 | A1 * | 7/2020 | Babaei | H04L 1/1671 |
| 2020/0313807 | A1 * | 10/2020 | Salem | H04L 1/1607 |
| 2022/0052795 | A1 * | 2/2022 | Karaki | H04W 72/04 |
| 2022/0086811 | A1 * | 3/2022 | Han | H04L 5/0055 |
| 2022/0264637 | A1 * | 8/2022 | Wang | H04W 72/1268 |
| 2022/0295558 | A1 * | 9/2022 | Lei | H04L 5/001 |
| 2023/0155735 | A1 * | 5/2023 | Dong | H04W 72/1268 |
| | | | | 370/329 |
| 2024/0121769 | A1 * | 4/2024 | Ma | H04L 5/0048 |

FOREIGN PATENT DOCUMENTS

| | | | | | |
|---|---|---|---|---|---|
| CN | 109314614 | A | | 2/2019 | |
| CN | 109792739 | A | | 5/2019 | |
| CN | 109842869 | A | | 6/2019 | |
| CN | 110535569 | A | | 12/2019 | |
| CN | 110557231 | A | | 12/2019 | |
| CN | 110708146 | A | | 1/2020 | |
| CN | 110945826 | A | | 3/2020 | |
| CN | 111670597 | A | * | 9/2020 | H04L 1/1812 |
| CN | 114375606 | A | * | 4/2022 | H04W 72/23 |
| CN | 111670597 | B | * | 10/2023 | H04L 1/1812 |
| CN | 117769873 | A | * | 3/2024 | H04L 1/0003 |
| CN | 113767668 | B | * | 9/2024 | H04W 72/1268 |
| CN | 114375606 | B | * | 3/2025 | H04W 72/23 |
| CN | 119946635 | A | * | 5/2025 | H04W 74/0808 |
| EP | 3229514 | A1 | * | 10/2017 | H04W 16/14 |
| WO | WO-2016101178 | A1 | * | 6/2016 | H04W 16/14 |
| WO | 2018071853 | A1 | | 4/2018 | |
| WO | WO-2018174613 | A1 | * | 9/2018 | H04L 1/1812 |
| WO | 2019005920 | A1 | | 1/2019 | |
| WO | 2019153126 | A1 | | 8/2019 | |
| WO | WO-2019152864 | A1 | * | 8/2019 | H04L 1/1812 |
| WO | 2020032587 | A1 | | 2/2020 | |
| WO | 2020032678 | A1 | | 2/2020 | |
| WO | 2020063301 | A1 | | 4/2020 | |
| WO | WO-2021203247 | A1 | * | 10/2021 | H04W 72/56 |
| WO | WO-2023010521 | A1 | * | 2/2023 | H04L 1/0003 |

OTHER PUBLICATIONS

Search Report issued in Application No. CN2020800007201 dated on Apr. 7, 2024, (4p).

3GPP TS 38.213 V15.1.0 (Mar. 2018), Technical Specification 3rd Generation Partnership Project, Technical Specification Group Radio Access Network, NR, Physical layer procedures for control (Release 15), dated Apr. 11, 2018, (77p).

International Search Report issued in Application No. PCT/CN2020/083578 dated Dec. 30, 2020, (4p).

Nokia et al., "On support of UL transmission with configured grants in NR-U", 3GPP TSG RAN WG1 Meeting #99, R1-1912260, Reno, US, Nov. 22, 2019, (9p).

* cited by examiner

UNLICENSED FREQUENCY BAND FEEDBACK METHOD, UNLICENSED FREQUENCY BAND FEEDBACK APPARATUS, AND STORAGE MEDIUM

CROSS REFERENCE TO RELATED APPLICATION

The present application is the U.S. National Stage of International Application No. PCT/CN2020/083578, filed on Apr. 7, 2020, the entire content of which is incorporated herein by reference for all purposes.

BACKGROUND

The new radio (NR) technology is supportive of the use of a hybrid automatic repeat request (HARQ) feedback retransmission mechanism.

SUMMARY

The disclosure provides an unlicensed frequency band feedback method, an unlicensed frequency band feedback apparatus and a storage medium.

According to a first aspect of the disclosure, provided is an unlicensed frequency band feedback method, performed by a network device and including:

determining that a high-priority physical uplink shared channel is received; and transmitting downlink feedback information, the downlink feedback information being used for feeding back hybrid automatic repeat request acknowledgement information for the high-priority physical uplink shared channel.

According to a second aspect of the disclosure, provided is an unlicensed frequency band feedback method, performed by a terminal and including:

transmitting a high-priority physical uplink shared channel; and receiving downlink feedback information, the downlink feedback information being used for feeding back hybrid automatic repeat request acknowledgement information for the high-priority physical uplink shared channel.

According to a third aspect of the disclosure, provided is an unlicensed frequency band feedback apparatus, including a processor and a memory configured to store an instruction executable by the processor.

Furthermore, the processor is configured to execute the unlicensed frequency band feedback method of the first aspect or any one of the examples of the first aspect.

According to a fourth aspect of the disclosure, provided is an unlicensed frequency band feedback apparatus, including a processor and a memory configured to store an instruction executable by the processor.

Furthermore, the processor is configured to execute the unlicensed frequency band feedback method of the second aspect or any one of the examples of the second aspect.

It is to be understood that both the foregoing general description and the following detailed description are illustrative and explanatory and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Description will here be made in detail to examples, instances of which are illustrated in the accompanying drawings. When the following description relates to the accompanying drawings, the same numbers in different accompanying drawings refer to the same or similar elements unless otherwise indicated. The examples described in the following examples do not represent all examples consistent with the disclosure. Rather, they are merely instances of devices and methods consistent with some aspects of the disclosure as detailed in the appended claims.

The disclosure relates to the technical field of communication, and particularly relates to an unlicensed frequency band feedback method, an unlicensed frequency band feedback apparatus, and a storage medium.

In the standard discussion and design of NR-unlicensed spectrum (NR-U), for a physical uplink shared channel (PUSCH) that a terminal transmits to a network device, the network device feeds back its corresponding hybrid automatic repeat request acknowledgement (HARQ-ACK) information. The HARQ-ACK information of the PUSCH is carried in downlink feedback information (DFI) and transmitted by the network device to the terminal. The DFI may be interpreted as a type of downlink control information (DCI). The HARQ-ACK information fed back to the terminal by the network device contains HARQ-ACK information corresponding to all uplink HARQ-ACK processes configured for the terminal.

In the related technology, no research on the occasion of transmitting the DFI to the terminal by the network device has been found. The network device can transmit the DFI to the terminal before all the uplink HARQ-ACK process is completed, and the HARQ-ACK information corresponding to all the uplink HARQ-ACK processes and needing to be fed back to the terminal by the network device is carried through the DFI.

Figure 1:
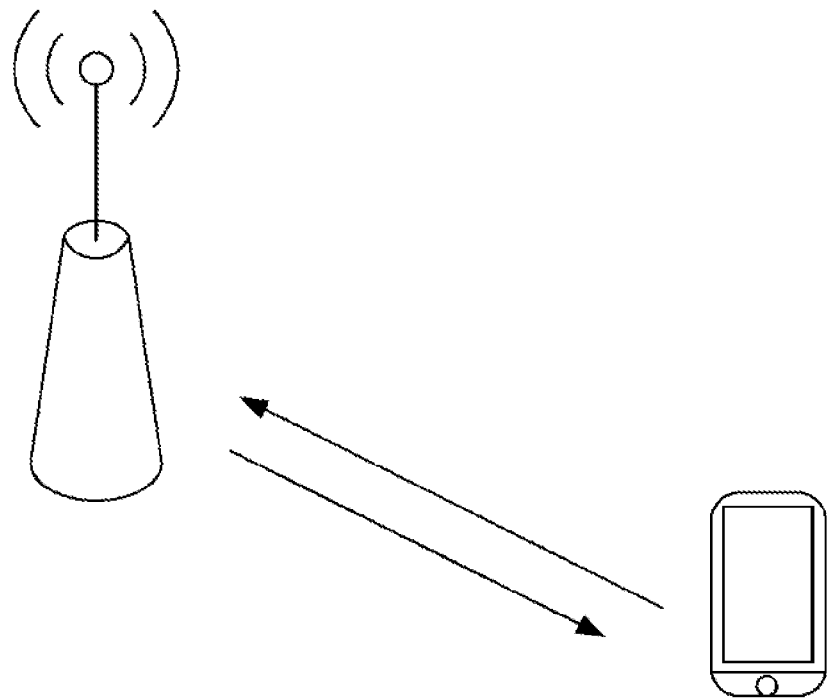
FIG. 1 is an architecture diagram of a communication system according to an example.

A feedback method provided in an example of the disclosure may be used in a radio communication system as shown in FIG. 1. With reference to FIG. 1, the radio communication system includes a terminal and a network device. The terminal is connected with the network device by means of a radio resource, to transmit and receive data.

It may be understood that the radio communication system as shown in FIG. 1 is merely illustrative and may also include other network devices, for instance, core network devices, radio relay devices, radio backhaul devices, etc., which are not depicted in FIG. 1. An example of the disclosure does not limit the number of network devices and the number of terminals included in the radio communication system.

It may be further understood that the radio communication system according to an example of the disclosure is a network providing a radio communication function. The radio communication system may use different communication technologies, for instance, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Networks may be classified into 2nd generation (2G) networks, 3G networks, 4G networks, or future evolved networks, for instance, 5G networks according to factors of capacity, rate, latency, etc. of different networks. The 5G networks may also be referred to as new radio (NR) networks. For convenience of description, the disclosure sometimes refers to a radio communication network simply as a network.

Further, the network device involved in the disclosure may also be referred to as a radio access network device. The radio access network device may be a base station, an evolved base station (evolved node B, base station), a home base station, an access point (AP) in a wireless fidelity (WIFI) system, a radio relay node, a radio backhaul node, a transmission point (TP), a transmission and reception point (TRP), etc., may be a gNB in an NR system, or may be a component or some of devices constituting a base station, etc. When being a vehicle-to-everything (V2X) communication system, the network device may also be a vehicle-mounted device. It is to be understood that an example of the disclosure does not limit a particular technology and a particular device configuration used by the network device.

Further, a terminal involved in the disclosure may also be referred to as a terminal device, user equipment (UE), a mobile station (MS), a mobile terminal (MT), etc., and is a device that provides a user with speech and/or data connectivity. For instance, the terminal may be a handheld device, a vehicle-mounted device, etc. which has a radio connection function. Some instance of the terminal include a mobile phone, a pocket personal computer (PPC), a palmtop computer, a personal digital assistant (PDA), a laptop computer, a tablet computer, a wearable device, a vehicle-mounted device, etc. Moreover, when being a vehicle-to-everything (V2X) communication system, the terminal device may also be a vehicle-mounted device. It is to be understood that an example of the disclosure does not limit a particular technology and a particular device configuration used by the terminal.

In FIG. 1, the terminal communicates with the network device, and a process in which the terminal transmits data to the network device may be referred to as uplink transmission. The process in which the network device transmits data to the terminal may be referred to as downlink transmission. The uplink transmission and downlink transmission processes of the terminal and the network device use the hybrid automatic repeat request (HARQ) feedback technology to guarantee the transmission reliability.

In standard discussion and design of R16NR-U, for a physical uplink shared channel (PUSCH) transmitted by the terminal to the network device, the network device feeds back HARQ acknowledgement (HARQ-ACK) information of the PUSCH. The PUSCH transmitted by the terminal to the network device includes a PUSCH dynamically scheduled by the network device by means of an uplink grant (UL grant) and a semi-static configured grant PUSCH (CG-PUSCH) used by the terminal. The HARQ-ACK information of the PUSCH is carried in downlink feedback information (DFI) and is fed back to the terminal by the network device. The HARQ-ACK information carried in downlink feedback information (DFI) includes HARQ-ACK information corresponding to all uplink HARQ-ACK processes configured for the terminal. For instance, the network device configures sixteen uplink HARQ-ACK processes for the terminal. Before the network device decides to transmit the DFI, twelve HARQ-ACK processes have corresponding actual PUSCH transmission and the network device completes PUSCH demodulation, the other four HARQ-ACK processes have no actual PUSCH transmission, or have the actual PUSCH transmission but the network device has barely time to demodulate the PUSCH since the time from the network device to transmit the DFI is too short, then the DFI transmitted by the network device needs to include the actual HARQ-ACK feedback information corresponding to the twelve HARQ-ACK processes, the HARQ-ACK information of the other four HARQ-ACK processes may be correspondingly set to be a default value (for instance, non-acknowledgment (NACK)) or set to be the HARQ-ACK information corresponding to the HARQ-ACK processes when the PUSCH is scheduled last time (that is, the HARQ-ACK information corresponding to the PUSCH scheduled last time on the HARQ-ACK processes is retransmitted once).

In 5G NR, the terminal concurrently supports an ultra reliable low latency communications (URLLC) service type and an enhanced mobile broadband (eMBB) service type. The URLLC service is a service type requiring high reliability and low latency. The eMBB service does not require such high reliability and low latency, but may require a larger data transmission rate.

For the URLLC service, it is desirable to transmit its HARQ-ACK information as soon as possible to reduce a latency between PDSCH and HARQ-ACK feedback, so as to reduce the entire data transmission latency. For the eMBB service, its HARQ-ACK feedback does not strictly require low latency, and HARQ-ACK information of a plurality of front and rear PDSCH in a time domain may be transmitted together, so as to improve resource use efficiency.

It is a common scene for one terminal to have both the URLLC service and the eMBB service. In order to support flexible multiplexing of both services, in the discussion of URLLC of R16, it is determined that priority of the PUSCH (including the dynamically scheduled PUSCH and the semi-statically configured PUSCH) is distinguishable at a physical layer. The priority of the semi-statically configured PUSCH is directly configured by means of a radio resource control (RRC) configuration parameter. The dynamically scheduled PUSCH is indicated by a physical layer, by downlink control information (DCI) or by a physical layer signal. For instance, 1 bit in DCI is used to indicate the priority of the dynamically scheduled PUSCH. For the URLLC uplink service, a high-priority PUSCH is generally used for scheduling.

In a current upcoming discussion of an R17 standard, it is to be investigated how to deploy the URLLC service on an unlicensed frequency band. When the URLLC service is deployed on an unlicensed frequency band, in order to support flexible multiplexing with the eMBB service, PUSCH scheduling of high priority and low priority should be both supported. For the URLLC uplink service, a high-priority PUSCH may be used for transmission. For the eMBB uplink service, a low-priority PUSCH may be used for transmission. For the high-priority PUSCH, the terminal needs to obtain the HARQ-ACK information as soon as possible, such that the HARQ-ACK information may be fast retransmitted under the condition that the first transmission is wrong, so as to reduce a data transmission latency.

In the related art, there is no research on an occasion for transmitting DFI to the terminal by the network device, and there is no research on how to perform HARQ-ACK feedback on the PUSCH of the URLLC service on the unlicensed frequency band either. The network device generally transmits the DFI to the terminal before all uplink HARQ-ACK processes are completed, HARQ-ACK information corresponding to all the uplink HARQ-ACK processes needing to be fed back to the terminal by the network device is carried by means of the DFI, but such a mode may not satisfy the URLLC uplink service using the high-priority PUSCH for scheduling.

Figure 2:
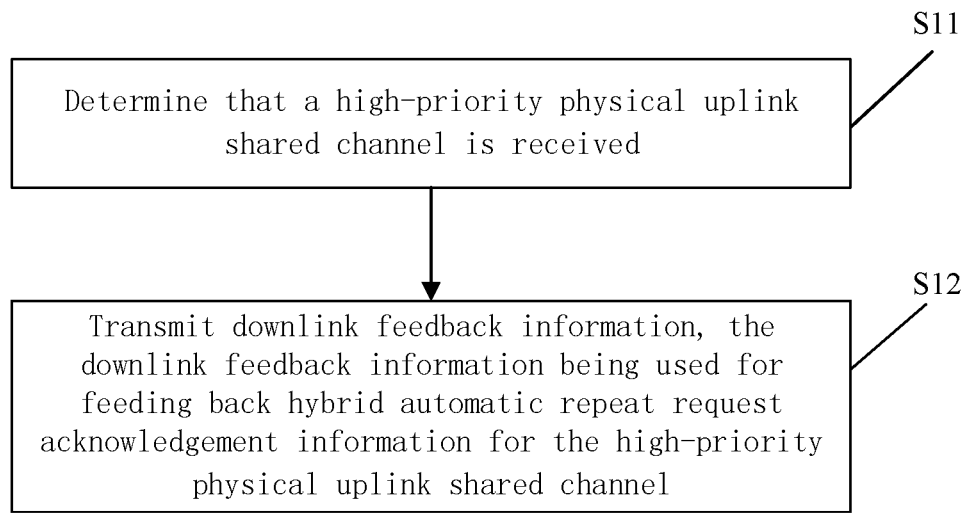
FIG. 2 is a flowchart of an unlicensed frequency band feedback method according to an example.

In view of this, an example of the disclosure provides an unlicensed frequency band feedback method. A network device determines that a high-priority PUSCH is received, and transmits DFI used for feeding back the HARQ-ACK information of the high-priority PUSCH, so as to feed back the HARQ-ACK information corresponding to the high-priority PUSCH in time FIG. 2 is a flowchart of an unlicensed frequency band feedback method according to an example. As shown in FIG. 2, the unlicensed frequency band feedback method is used in a network device and includes:

S11, it is determined that a high-priority PUSCH is received.

S12, DFI used for feeding back HARQ-ACK information of the high-priority PUSCH is transmitted.

In the example of the disclosure, a network device determines that the high-priority PUSCH is received, and transmits the DFI to a terminal after a time domain resource of ending position of the PUSCH, to feed back the HARQ-ACK information of the high-priority PUSCH in time, which is suitable for an URLLC uplink service with the high-priority PUSCH for scheduling.

The network device transmits the DFI to the terminal after receiving the high-priority PUSCH. After transmitting the high-priority PUSCH, the terminal may receive the DFI representing the HARQ-ACK information of the high-priority PUSCH, and then may obtain the HARQ-ACK information as soon as possible, such that the HARQ-ACK information may be fast retransmitted under the condition that the first transmission is wrong, so as to reduce a data transmission latency.

Figure 3:
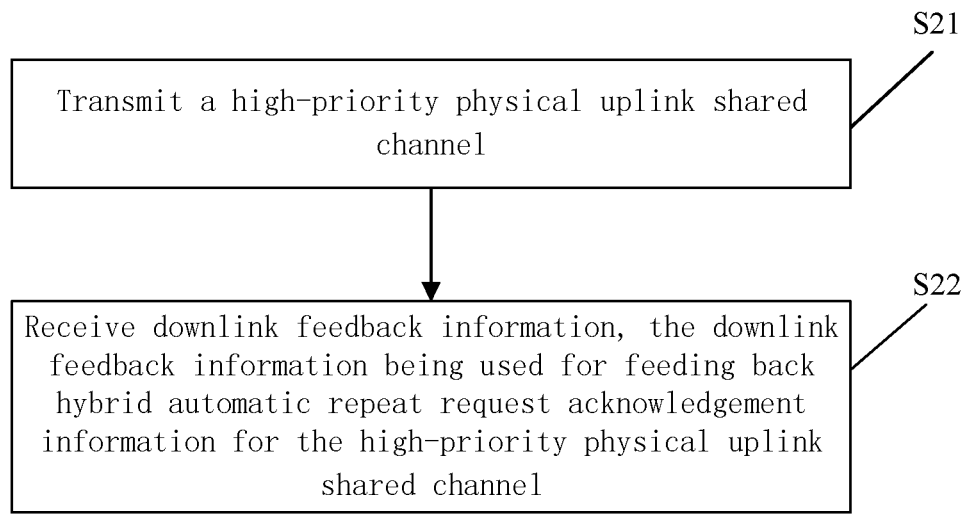
FIG. 3 is a flowchart of an unlicensed frequency band feedback method according to an example.

FIG. 3 is a flowchart of an unlicensed frequency band feedback method according to an example. As shown in FIG. 3, the unlicensed frequency band feedback method is used in a terminal and includes:

S21, a high-priority PUSCH is transmitted.

S22, DFI used for feeding back HARQ-ACK information of the high-priority PUSCH is received.

According to the example of the disclosure, an implementation process of the unlicensed frequency band feedback method is explained in combination with practical application.

In the example of the disclosure, the high-priority PUSCH received by the network device may be a high-priority PUSCH scheduled by the network device for the terminal by using DCI, or may also be a PUSCH transmitted by the terminal by using a high-priority CG-PUSCH resource and received by the network device. When the network device receives the high-priority PUSCH scheduled for the terminal by using the DCI, or the network device receives the PUSCH transmitted by the terminal by using the high-priority CG-PUSCH resource, the network device transmits the DFI to the terminal after a time domain resource of ending position of the PUSCH, and the DFI is used for feeding back the HARQ-ACK information of the high-priority PUSCH.

In the example of the disclosure, the high-priority PUSCH corresponds to a low-latency service, and the low-latency service is more sensitive to the latency compared with other high-latency services, that is, a requirement of the service corresponding to a low-latency PDSCH on the latency is higher than that of the service corresponding to a high-latency PDSCH. For instance, the service corresponding to the low-latency PDSCH is an URLLC service, and the service corresponding to the high-latency PDSCH is an eMBB service. In the example of the disclosure, priority of the low-latency PDSCH is higher than that of the high-latency PDSCH.

In an example of the example of the disclosure, the occasion for transmitting the DFI to the terminal by the network device may be a first DCI monitoring occasion configured to monitor the DFI after the time domain resource of ending position of the high-priority PUSCH. The DCI monitoring occasion is a periodic time-frequency resource position where the terminal needs to monitor the DCI, and is also a time-frequency resource position where the network device may transmit various DCI. In response to determining that the network device configures that the DFI may only be transmitted on some of DCI monitoring occasions, the terminal may only monitor the DFI on the configured DCI monitoring occasions.

In the example of the disclosure, the network device transmits the available DFI used for feeding back the HARQ-ACK information of the high-priority PUSCH at the first DCI monitoring occasion configured to monitor the DFI after the time domain resource of ending position of the high-priority PUSCH. The terminal receives the DFI used for feeding back the HARQ-ACK information of the high-priority PUSCH at the first available DCI monitoring occasion configured to monitor the DFI after the time domain resource of ending position of the high-priority PUSCH. The available downlink control information monitoring occasion is a downlink control information monitoring occasion configured to monitor the downlink feedback information.

In the example of the disclosure, an interval between a time domain resource starting position corresponding to the available DCI monitoring occasion capable of monitoring the DFI and the time domain resource of ending position of the high-priority PUSCH is greater than or equal to a first duration T. In other words, the network device configures the first DCI monitoring occasion capable of monitoring the DFI after the duration T after the time domain resource of ending position of the high-priority PUSCH as the first DCI monitoring occasion for transmitting the DFI used for feeding back the HARQ-ACK information of the high-priority PUSCH. The terminal receives the DFI used for feeding back the HARQ-ACK information of the high-priority PUSCH at the first available DCI monitoring occasion configured to monitor the DFI after the duration T after the time domain resource of ending position of the high-priority PUSCH.

According to the example of the disclosure, the specified duration T is used for demodulating the PUSCH by the network device, and may be agreed by a protocol, indicated by the network device via higher-layer signaling, determined by negotiation between the network device and the terminal; or reported by the terminal device to the network device. For instance, T may be a value set according to subcarrier spacing of the PUSCH. For instance, when the subcarrier spacing is 30 KHZ, T is six time domain symbols. In some examples, determination by negotiation between the network device and the terminal may be that the terminal reports one or more optional durations, and the network device determines the first duration from the one or more optional durations and notifies the terminal device.

In another example of the example of the disclosure, a timer with a second duration is configured for the terminal, and the timer is started at the time domain resource of ending position of the high-priority PUSCH. The network device starts the timer at the high-priority time domain resource of ending position, and transmits DFI used for feeding back the HARQ-ACK information of the high-priority PUSCH in an effective time period of the timer. The terminal starts the timer at the of the high-priority time domain resource of ending position, and receives the DFI used for feeding back the HARQ-ACK information of the high-priority PUSCH in the effective time period of the timer. The effective time period of the timer refers to a period from when the timer is started to when the timer has not expired.

In the example of the disclosure, the second duration of the timer started after the time domain resource of ending position of the high-priority PUSCH may be configured to the terminal by the network device via higher-layer signaling. For instance, the second duration is configured to the terminal by means of radio resource control (RRC) layer signaling or media access control (MAC) layer signaling. The second duration may further be agreed by a protocol, determined by negotiation between the network device and the terminal, or reported by the terminal to the network device.

Further, in the example of the disclosure, the DFI transmitted by the network device to the terminal may be used for feeding back the HARQ-ACK information of the high-priority PUSCH, and may also be used for feeding back HARQ-ACK information corresponding to other uplink HARQ-ACK processes. The other uplink HARQ-ACK processes may be understood as HARQ-ACK processes different from the high-priority PUSCH in the uplink HARQ-ACK processes transmitted by the terminal to the network device. In the example of the disclosure, feeding back the HARQ-ACK information of the high-priority PUSCH and the HARQ-ACK information corresponding to other uplink HARQ-ACK processes by means of the DFI may improve HARQ-ACK information transmission efficiency.

In an example of the example of the disclosure, the HARQ-ACK information in the DFI fed back to the terminal by the network device includes the HARQ-ACK information of the high-priority PUSCH, and the HARQ-ACK information of other uplink HARQ-ACK processes may be set to be a default value (for instance, NACK). All other HARQ-ACK processes are set to be default values, such that the terminal may fully use the default values as known information in the process of decoding the HARQ-ACK information in the DFI, thus improving a decoding success probability.

In another example of the example of the disclosure, the DFI fed back to the terminal by the network device may also feed back the high-priority PUSCH and a PUSCH which is not fed back before the time domain position of the high-priority PUSCH. Other uplink HARQ-ACK processes may all be set to be default values (for instance, NACK). The DFI fed back to the terminal by the network device feeds back the high-priority PUSCH and the PUSCH which is not fed back before the time domain position of the high-priority PUSCH, such that the HARQ-ACK information of other low-priority PUSCHs may be fed back while the HARQ-ACK information of the high-priority PUSCH is fed back, so as to improve the HARQ-ACK information transmission efficiency.

In the example of the disclosure, the network device feeds back the DFI representing the HARQ-ACK information of the high-priority PUSCH to the terminal in the DCI monitoring occasion or before a timeout of the timer with the second duration (in the effective time period). The terminal receives the DFI representing the HARQ-ACK information of the high-priority PUSCH in the DCI monitoring occasion or the effective time period of the timer. In an example, in respond to determining that the terminal receives no DFI representing the HARQ-ACK information of the high-priority PUSCH in the DCI monitoring occasion or receives no DFI representing the HARQ-ACK information of the high-priority PUSCH in the effective time period of the timer, the terminal determines that the transmission of the high-priority PUSCH is not successful and retransmits the high-priority PUSCH.

In the example of the disclosure, for the case where a configured grant PUSCH (CG-PUSCH) is configured, the terminal autonomously retransmits the high-priority PUSCH by means of the CG-PUSCH. For the case where no CG-PUSCH is configured, the terminal waits for a retransmitting scheduling instruction of the network device, and retransmits the high-priority PUSCH after receiving the retransmitting scheduling instruction transmitted by the network device.

Figure 4:
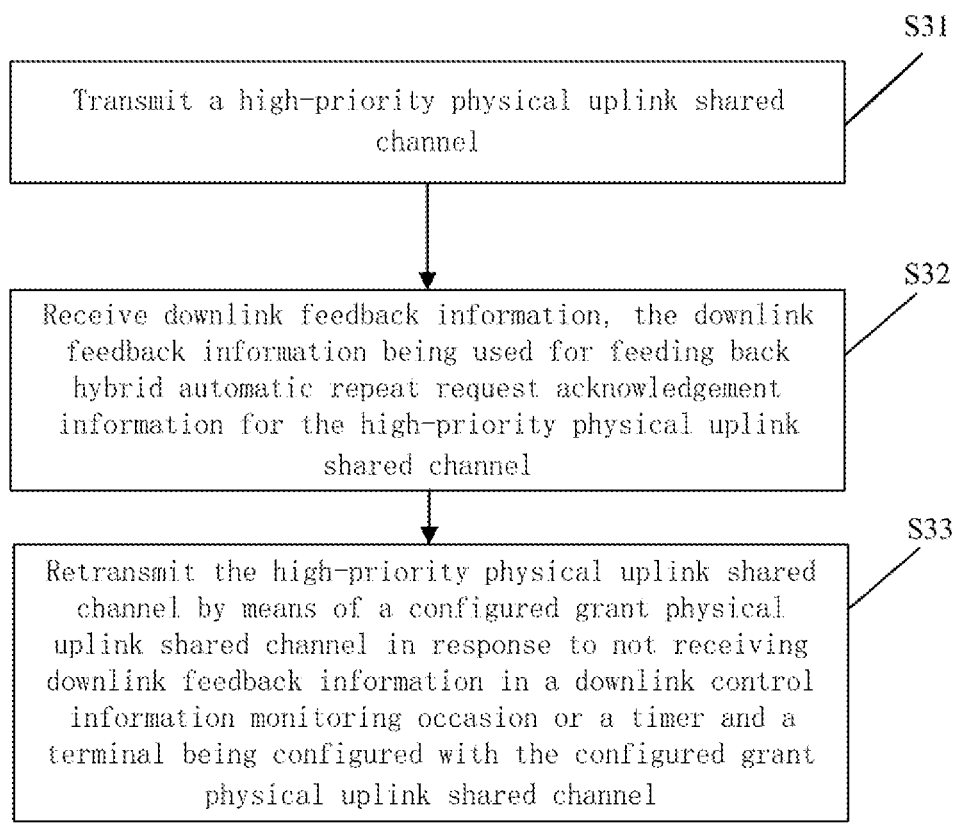
FIG. 4 is a flowchart of an unlicensed frequency band feedback method according to an example.

FIG. 4 is a flowchart of an unlicensed frequency band feedback method according to an example. As shown in FIG. 4, the unlicensed frequency band feedback method is used in a terminal and includes:

S31, a high-priority PUSCH is transmitted.

S32, DFI used for feeding back HARQ-ACK information of the high-priority PUSCH is received.

In S33, in response to not receiving DFI in the DCI monitoring occasion or the effective time period of the timer and the terminal being configured with the configured CG-PUSCH, the high-priority PUSCH is retransmitted by means of the CG-PUSCH.

According to the unlicensed frequency band feedback method provided in the example of the disclosure, the network device transmits the DFI to the terminal after receiving the high-priority PUSCH. After transmitting the high-priority PUSCH, the terminal may receive the DFI representing the HARQ-ACK information of the high-priority PUSCH, and then may obtain the HARQ-ACK information as soon as possible, such that the HARQ-ACK information may be fast retransmitted under the condition that the first transmission is wrong, so as to reduce a data transmission latency. By using the unlicensed frequency band feedback method provided in the example of the disclosure, HARQ-ACK feedback is carried out on the PUSCH of the URLLC service. According to the method, an existing DFI feedback mode in an original NR-U protocol may be fully used, and low-latency HARQ-ACK feedback is provided for the eMBB and URLLC services.

In the example of the disclosure, the high-priority PUSCH corresponds to a low-latency service, and the low-latency service is more sensitive to the latency compared with other high-latency services, that is, a requirement of the service corresponding to a low-latency PDSCH on the latency is higher than that of the service corresponding to a high-latency PDSCH. For instance, the service corresponding to the low-latency PDSCH is an URLLC service, and the service corresponding to the high-latency PDSCH is an eMBB service. In the example of the disclosure, priority of the low-latency PDSCH is higher than that of the high-latency PDSCH.

It may be understood that the unlicensed frequency band feedback method provided in the example of the disclosure may be used in an interaction process of the terminal and the network device. Reference may be made to related description of the examples above for the process for achieving a feedback method for unlicensed frequency band feedback information by means of interaction between the terminal and the network device, which will not be repeated here.

Based on the same concept, the example of the disclosure further provides an unlicensed frequency band feedback apparatus.

It may be understood that in order to achieve the above functions, the unlicensed frequency band feedback apparatus provided in the example of the disclosure includes a corresponding hardware structure and/or software module for executing a function. The example of the disclosure may be implemented in hardware or a combination of hardware and computer software, in combination with units and algorithm steps of each instance disclosed in the example of the disclosure. Whether a certain function is executed by hardware or computer software-driven hardware depends on particular application of the technical solution and design constraints. Those skilled in the art may use different methods to implement the described functions for each particular application, but such implementation should not be considered to be beyond the scope of the technical solution of the example of the disclosure.

Figure 5:
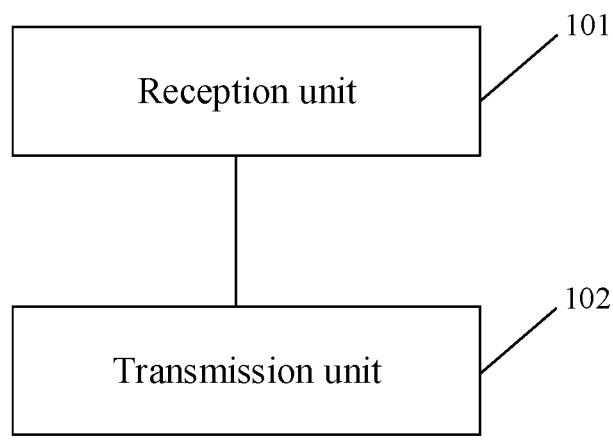
FIG. 5 is a block diagram of an unlicensed frequency band feedback apparatus according to an example.

FIG. 5 is a block diagram of an unlicensed frequency band feedback apparatus according to an example. With reference to FIG. 5, the unlicensed frequency band feedback apparatus 100 is used for a network device and includes a reception unit 101 and a transmission unit 102.

The reception unit 101 is configured to determine that a high-priority physical uplink shared channel is received. The transmission unit 102 is configured to transmit downlink feedback information, the downlink feedback information being used for feeding back hybrid automatic repeat request acknowledgement information for the high-priority physical uplink shared channel.

In an example, the transmission unit 102 transmits the downlink feedback information at a first available downlink control information monitoring occasion after a time domain resource of ending position of the high-priority physical uplink shared channel. The available downlink control information monitoring occasion is a downlink control information monitoring occasion configured to monitor the downlink feedback information.

In another example, an interval between a time domain resource starting position corresponding to the first available downlink control information monitoring occasion and the time domain resource of ending position of the high-priority physical uplink shared channel is greater than or equal to a first duration.

In yet another example, the first duration is agreed by a protocol, indicated by a network device via higher-layer signaling, determined by negotiation between the network device and the terminal, or reported by the terminal to the network device.

In yet another example, the transmission unit 102 sends the downlink feedback information in a second duration after the time domain resource of ending position of the high-priority physical uplink shared channel.

In yet another example, the downlink feedback information is further used for feeding back second hybrid automatic repeat request acknowledgement information corresponding to other uplink hybrid automatic repeat request acknowledgement process. Priority of a physical uplink shared channel corresponding to the second hybrid automatic repeat request acknowledgement information is lower than priority of the high-priority physical uplink shared channel.

In yet another example, the second hybrid automatic repeat request acknowledgement information is a set default value.

In yet another example, the other uplink hybrid automatic repeat request acknowledgement process is uplink hybrid automatic repeat request acknowledgement process that is not fed back before the time domain resource of ending position of the high-priority physical uplink shared channel is received.

Figure 6:
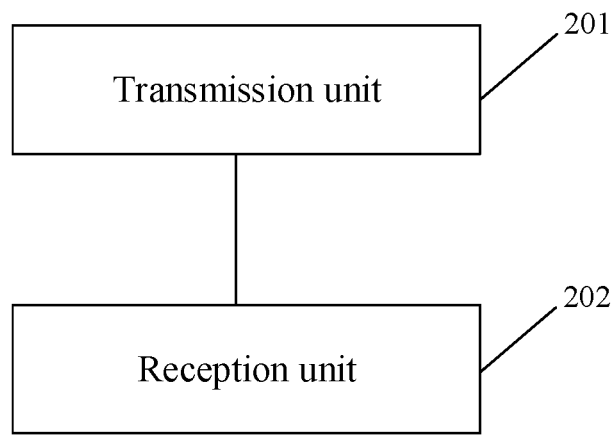
FIG. 6 is a block diagram of an unlicensed frequency band feedback apparatus according to an example.

FIG. 6 is a block diagram of an unlicensed frequency band feedback apparatus according to an example. With reference to FIG. 6, the unlicensed frequency band feedback apparatus 200 is used for a network device and includes a reception unit 201 and a transmission unit 202.

The transmission unit 201 is configured to transmit a high-priority physical uplink shared channel. The reception unit 202 is configured to receive downlink feedback information, the downlink feedback information being used for feeding back hybrid automatic repeat request acknowledgement information for the high-priority physical uplink shared channel.

In an example, the reception unit 202 receives the downlink feedback information at a first available downlink control information monitoring occasion after a time domain resource of ending position of the high-priority physical uplink shared channel. The available downlink control information monitoring occasion is a downlink control information monitoring occasion configured to monitor the downlink feedback information.

In another example, an interval between a time domain resource starting position corresponding to the first available downlink control information monitoring occasion and the time domain resource of ending position of the high-priority physical uplink shared channel is greater than or equal to a first duration.

In yet another example, the first duration is agreed by a protocol, indicated by a network device via higher-layer signaling, determined by negotiation between the network device and the terminal, or reported by the terminal to the network device.

In yet another example, the reception unit 202 receives the downlink feedback information in second duration after a time domain resource of ending position of the high-priority physical uplink shared channel.

In yet another example, the downlink feedback information is further used for feeding back second hybrid automatic repeat request acknowledgement information corresponding to other uplink hybrid automatic repeat request acknowledgement process. Priority of a physical uplink shared channel corresponding to the second hybrid automatic repeat request acknowledgement information is lower than priority of the high-priority physical uplink shared channel.

In yet another example, the second hybrid automatic repeat request acknowledgement information is a set default value.

In yet another example, the other uplink hybrid automatic repeat request acknowledgement process is uplink hybrid automatic repeat request acknowledgement process which are not fed back before the time domain resource of ending position of the high-priority physical uplink shared channel is received by the network device.

In yet another example, the transmission unit 201 is further configured to retransmit the high-priority physical uplink shared channel by means of a configured grant physical uplink shared channel in response to not receiving downlink feedback information in the first available downlink control information monitoring occasion or the first duration and the terminal being configured with the configured grant physical uplink shared channel.

With respect to the apparatus in the above example, specific ways in which the various modules execute operations have been described in detail in the examples relating to the method, and will not be described in detail here.

Figure 7:
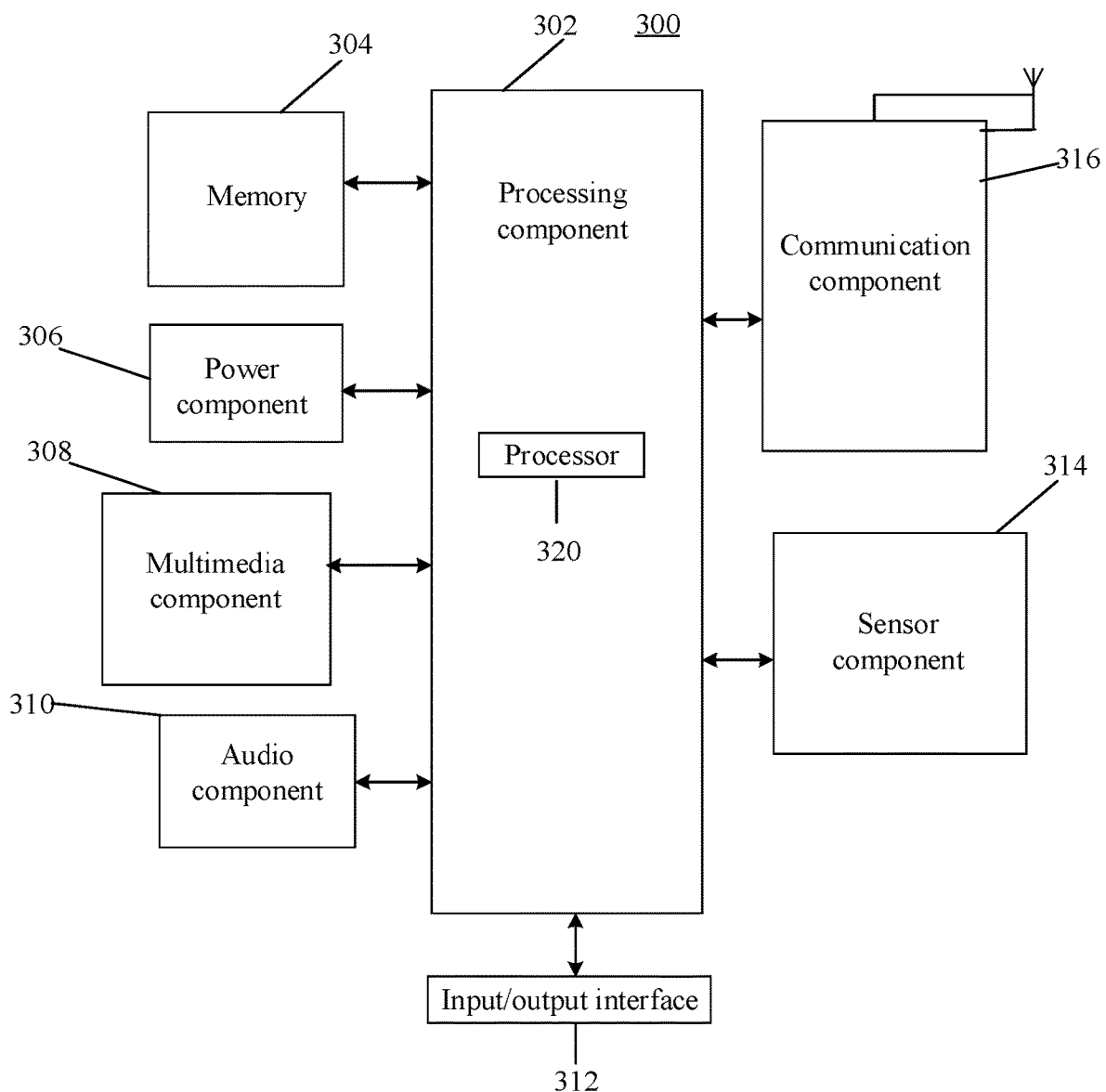
FIG. 7 is a block diagram for an unlicensed frequency band feedback apparatus according to an example.

FIG. 7 is a block diagram of an apparatus 300 for transmitting NR-U feedback information according to an example. For instance, the apparatus 300 may be a mobile phone, a computer, a digital broadcast terminal, a messaging device, a gaming console, a tablet device, a medical device, a fitness device, a personal digital assistant, etc.

With reference to FIG. 7, the apparatus 300 may include one or more of a processing component 302, a memory 304, a power component 306, a multimedia component 308, an audio component 310, an input/output (I/O) interface 312, a sensor component 314, and a communication component 316.

The processing component 302 generally controls overall operation of the apparatus 300, for instance, operations associated with display, phone calls, data communications, camera operations, and recording operations. The processing component 302 may include one or more processors 320 to execute an instruction to complete all or part of the steps of the method above. Moreover, the processing component 302 may include one or more modules to facilitate interaction between the processing component 302 and other assemblies. For instance, the processing component 302 may include the multimedia module to facilitate interaction between the multimedia component 308 and the processing component 302.

The memory 304 is configured to store various types of data to support operation on the apparatus 300. Instances of such data include an instruction, operated on the apparatus 300, for any application or method, contact data, phonebook data, messages, pictures, video, etc. The memory 304 may be implemented by any type of volatile or non-volatile memory apparatus, or their combinations, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 306 supplies power to the various assemblies of the apparatus 300. The power component 306 may include a power management system, one or more power sources, and other assemblies associated with power generating, managing, and distributing for the apparatus 300.

The multimedia component 308 includes a screen that provides an output interface between the apparatus 300 and the user. In some examples, the screen may include a liquid crystal display (LCD) and a touch panel (TP). Under the condition that the screen includes the touch panel, the screen may be implemented as a touch screen to receive an input signal from the user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia component 308 includes a front-facing camera and/or a rear-facing camera. When the apparatus 300 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio component 310 is configured to output and/or input an audio signal. For instance, the audio component 310 includes a microphone (MIC) configured to receive an external audio signal when the apparatus 300 is in the operational mode, for instance, a calling mode, a recording mode, and a speech recognition mode. The received audio signal may be further stored in the memory 304 or sent via the communication component 316. In some examples, the audio component 310 further includes a speaker for outputting the audio signal.

The I/O interface 312 provides an interface between the processing component 302 and a peripheral interface module. The peripheral interface module may be a keyboard, a click wheel, a button, etc. These buttons may include, but are not limited to, a home button, a volume button, a start button, and a lock button.

The sensor component 314 includes one or more sensors for providing state assessments of various aspects for the apparatus 300. For instance, the sensor component 314 may detect an on/off state of the apparatus 300 and relative positioning of the assemblies. for instance, the assemblies are a display and a keypad of the apparatus 300. The sensor component 314 may also detect a change in position of the apparatus 300 or an component of the apparatus 300, the presence or absence of contact between the user and the apparatus 300, orientation or acceleration/deceleration of the apparatus 300, and temperature variation of the apparatus 300. The sensor component 314 may include a proximity sensor configured to detect presence of nearby objects in the absence of any physical contact. The sensor component 314 may also include a light sensor, for instance, a complementary metal oxide semiconductor (CMOS) or charge coupled device (CCD) image sensor, for use in imaging applications. In some examples, the sensor component 314 may also include an acceleration sensor, a gyroscopic sensor, a magnetic sensor, a pressure sensor, or a temperature sensor.

The communication component 316 is configured to facilitate communications between the apparatus 300 and other device in a wired or wireless mode. The apparatus 300 may access a wireless network based on a communication standard, for instance, Wi-Fi, 2G, or 3G, or their combinations. In an example, the communication component 316 receives a broadcast signal or broadcast related information from an external broadcast management system via a broadcast channel. In an example, the communication component 316 also includes a near field communication (NFC) module to facilitate short-range communication. For instance, the NFC module may be implemented based on a radio frequency identification (RFID) technology, an infrared data association (IrDA) technology, an ultra-wideband (UWB) technology, a bluetooth (BT) technology, and other technologies.

In an example, the apparatus 300 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method above.

In the example, further provided is a non-transitory computer-readable storage medium including an instruction, for instance, a memory 304 including an instruction, and the instruction may be executed by the processor 320 of the apparatus 300 so as to execute the method above. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

Figure 8:
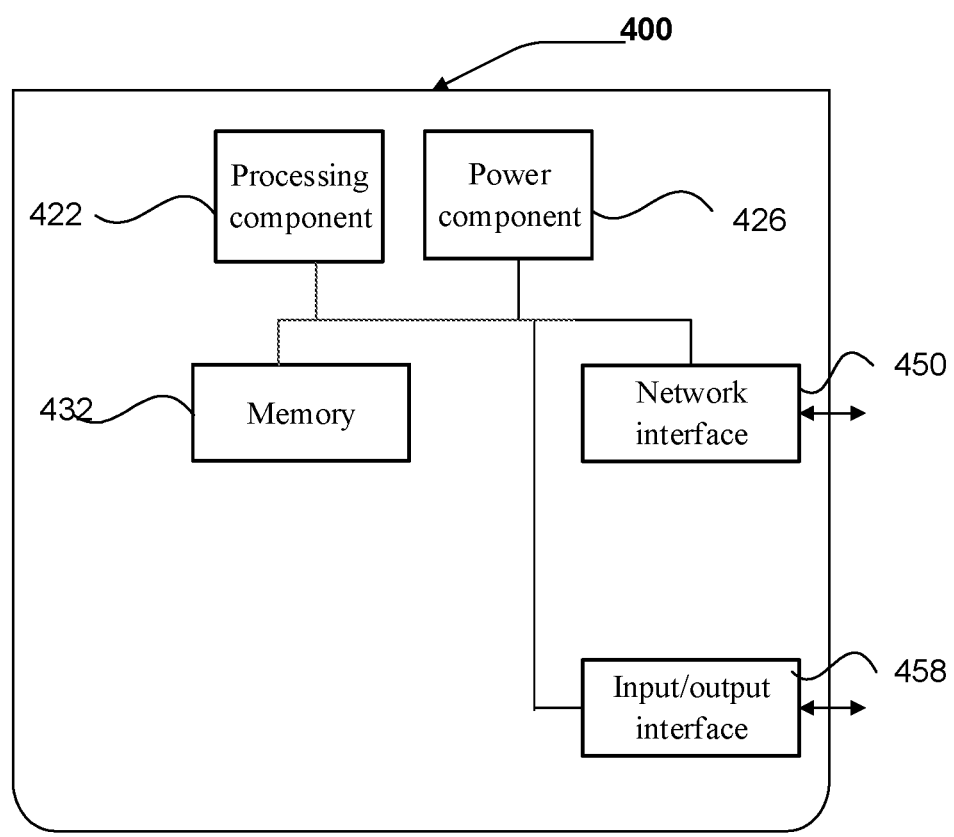
FIG. 8 is a block diagram for an unlicensed frequency band feedback apparatus according to an example.

FIG. 8 is a block diagram of an apparatus 400 for transmitting NR-U feedback information according to an example. For instance, the apparatus 400 may be provided as a network device, for instance, a base station. With reference to FIG. 8, the apparatus 400 includes a processing component 422, and further includes one or more processors, and memory resources represented by a memory 432 for storing an instruction, for instance, an application program, executable by the processing component 422. The application program stored in the memory 432 may include one or more modules, each of which corresponds to a set of instructions. Further, the processing component 422 is configured to execute the instructions to implement the above method.

The apparatus 400 may further include a power supply component 426 configured to implement power supply management of the apparatus 400, a wired or radio network interface 450 configured to connect the apparatus 400 to a network, and an input/output (I/O) interface 458. The apparatus 400 may operate an operating system stored in the memory 432, such as Windows Server™, Mac OS X™, Unix™, Linux™, FreeBSD™, etc.

In an example, further provided is a non-transitory computer-readable storage medium including an instruction, for instance, a memory 432 including an instruction, and the instruction may be executed by the processor 422 of the apparatus 400 so as to execute the method above. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

It may be further understood that in the disclosure, "a plurality" refers to two or more, and other quantifiers are analogous to it. "and/or" is used to describe an associated relationship between associated objects and means three relationships, for instance, A and/or B may mean A alone, A and B together, and B alone. The character "/" generally indicates that the associated objects are in an "or" relationship. Singular forms "a", "an" and "the" are intended to include plural forms as well, unless the context clearly indicates otherwise.

It may be further understood that the terms "first", "second", etc. are used to describe various information, but the information should not be limited by these terms. These terms are merely used to distinguish the same type of information from each other and do not denote a particular order or degree of importance. Indeed, the expressions "first", "second", etc. may be used interchangeably. For instance, first information may also be referred to as second information, and similarly, second information may also be referred to as first information, without departing from the scope of the disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

It may be further understood that in examples of the disclosure, while operations are depicted in the drawings in a particular order, it should not be understood as requiring that such operations be executed in the particular order shown or in serial order, or that all illustrated operations be executed, to achieve desirable results. In certain circumstances, multitasking and parallel processing may be advantageous.

Other examples of the disclosure will readily occur to those skilled in the art upon consideration of the specification and practice of the disclosure. The disclosure is intended to cover any variations, uses, or adaptations of the disclosure, and these variations, uses, or adaptations follow general principles of the disclosure and include common general knowledge or customary technical means in the technical field not disclosed in the disclosure. The specification and examples are considered as illustrative only, and a true scope and spirit of the disclosure are indicated by the following claims.

It is to be understood that the disclosure is not limited to the precise structure that has been described above and shown in the accompanying drawings, and that various modifications and changes may be made without departing from its scope. The scope of the disclosure is limited only by the appended claims.

According to an aspect of the disclosure, provided is an unlicensed frequency band feedback method, performed by a network device and including:

determining that a high-priority physical uplink shared channel is received; and transmitting downlink feedback information, the downlink feedback information being used for feeding back hybrid automatic repeat request acknowledgement information for the high-priority physical uplink shared channel.

In an example, the transmitting downlink feedback information includes: transmitting the downlink feedback information at a first available downlink control information monitoring occasion after a time domain resource of ending position of the high-priority physical uplink shared channel, where the first available downlink control information monitoring occasion is one available downlink control information monitoring occasion of a plurality of available downlink control information monitoring occasions, and each of the available downlink control information monitoring occasion is a downlink control information monitoring occasion configured to monitor the downlink feedback information.

In another example, an interval between a time domain resource starting position corresponding to the first available downlink control information monitoring occasion and the time domain resource of ending position of the high-priority physical uplink shared channel is greater than or equal to a first duration.

In yet another example, the first duration is agreed by a protocol, indicated by a network device via higher-layer signaling, or determined by negotiation between the network device and a terminal device.

In yet another example, the transmitting downlink feedback information includes: transmitting the downlink feedback information in a second duration after a time domain resource of ending position of the high-priority physical uplink shared channel.

In yet another example, the downlink feedback information is further used for feeding back second hybrid automatic repeat request acknowledgement information corresponding to other uplink hybrid automatic repeat request acknowledgement process, and priority of a physical uplink shared channel corresponding to the second hybrid automatic repeat request acknowledgement information is lower than priority of the high-priority physical uplink shared channel.

In yet another example, the second hybrid automatic repeat request acknowledgement information is a set default value.

In yet another example, the other uplink hybrid automatic repeat request acknowledgement process is uplink hybrid automatic repeat request acknowledgement process that is not fed back before a time domain resource of ending position of the high-priority physical uplink shared channel is received.

According to an aspect of the disclosure, provided is an unlicensed frequency band feedback method, performed by a terminal and including:

transmitting a high-priority physical uplink shared channel; and receiving downlink feedback information, the downlink feedback information being used for feeding back hybrid automatic repeat request acknowledgement information for the high-priority physical uplink shared channel.

In an example, the receiving downlink feedback information includes: receiving the downlink feedback information at a first available downlink control information monitoring occasion after a time domain resource of ending position of the high-priority physical uplink shared channel, where the first available downlink control information monitoring occasion is one available downlink control information monitoring occasion of a plurality of available downlink control information monitoring occasions, and each of the available downlink control information monitoring occasion is a downlink control information monitoring occasion configured to monitor the downlink feedback information.

In another example, an interval between a time domain resource starting position corresponding to the first available downlink control information monitoring occasion and the time domain resource of ending position of the high-priority physical uplink shared channel is greater than or equal to a first duration.

In yet another example, the first duration is agreed by a protocol, indicated by a network device via higher-layer signaling, or determined by negotiation between the network device and the terminal device.

In yet another example, the receiving downlink feedback information includes: receiving the downlink feedback information in a second duration after a time domain resource of ending position of the high-priority physical uplink shared channel.

In yet another example, the downlink feedback information is further used for feeding back second hybrid automatic repeat request acknowledgement information corresponding to other uplink hybrid automatic repeat request acknowledgement process, and priority of a physical uplink shared channel corresponding to the second hybrid automatic repeat request acknowledgement information is lower than priority of the high-priority physical uplink shared channel.

In yet another example, the second hybrid automatic repeat request acknowledgement information is a set default value.

In yet another example, the other uplink hybrid automatic repeat request acknowledgement process is uplink hybrid automatic repeat request acknowledgement process that is not fed back before the time domain resource of ending position of the high-priority physical uplink shared channel is received by the network device.

In yet another example, the unlicensed frequency band feedback method further includes: retransmitting the high-priority physical uplink shared channel by means of a configured grant physical uplink shared channel in response to not receiving downlink feedback information in the first available downlink control information monitoring occasion or the first duration and the terminal being configured with the configured grant physical uplink shared channel.

According to an aspect of the disclosure, provided is an unlicensed frequency band feedback apparatus, used for a network device and including:

a reception unit configured to determine that a high-priority physical uplink shared channel is received; and a transmission unit configured to transmit downlink feedback information, the downlink feedback information being used for feeding back hybrid automatic repeat request acknowledgement information for the high-priority physical uplink shared channel.

In an example, the transmission unit transmits the downlink feedback information at a first available downlink control information monitoring occasion after a time domain resource of ending position of the high-priority physical uplink shared channel, where the first available downlink control information monitoring occasion is one available downlink control information monitoring occasion of a plurality of available downlink control information monitoring occasions, and each of the available downlink control information monitoring occasion is a downlink control information monitoring occasion configured to monitor the downlink feedback information.

In another example, an interval between a time domain resource starting position corresponding to the first available downlink control information monitoring occasion and the time domain resource of ending position of the high-priority physical uplink shared channel is greater than or equal to a first duration.

In yet another example, the first duration is agreed by a protocol, indicated by a network device via higher-layer signaling, or determined by negotiation between the network device and a terminal device.

In yet another example, the transmission unit transmits the downlink feedback information in a second duration after a time domain resource of ending position of the high-priority physical uplink shared channel.

In yet another example, the downlink feedback information is further used for feeding back second hybrid automatic repeat request acknowledgement information corresponding to other uplink hybrid automatic repeat request acknowledgement process, and priority of a physical uplink shared channel corresponding to the second hybrid automatic repeat request acknowledgement information is lower than priority of the high-priority physical uplink shared channel.

In yet another example, the second hybrid automatic repeat request acknowledgement information is a set default value.

In yet another example, the other uplink hybrid automatic repeat request acknowledgement process is uplink hybrid automatic repeat request acknowledgement process that is not fed back before a time domain resource of ending position of the high-priority physical uplink shared channel is received.

According to an aspect of the disclosure, provided is an unlicensed frequency band feedback apparatus, used for a terminal and including:
a transmission unit configured to transmit a high-priority physical uplink shared channel; and a reception unit configured to receive downlink feedback information, the downlink feedback information being used for feeding back hybrid automatic repeat request acknowledgement information for the high-priority physical uplink shared channel.

In an example, the reception unit receives the downlink feedback information at a first available downlink control information monitoring occasion after a time domain resource of ending position of the high-priority physical uplink shared channel, where the first available downlink control information monitoring occasion is one available downlink control information monitoring occasion of a plurality of available downlink control information monitoring occasions, and each of the available downlink control information monitoring occasion is a downlink control information monitoring occasion configured to monitor the downlink feedback information.

In another example, an interval between a time domain resource starting position corresponding to the first available downlink control information monitoring occasion and the time domain resource of ending position of the high-priority physical uplink shared channel is greater than or equal to a first duration.

In yet another example, the first duration is agreed by a protocol, indicated by a network device via higher-layer signaling, or determined by negotiation between the network device and a terminal device.

In yet another example, the reception unit receives the downlink feedback information in a second duration after a time domain resource of ending position of the high-priority physical uplink shared channel.

In yet another example, the downlink feedback information is further used for feeding back second hybrid automatic repeat request acknowledgement information corresponding to other uplink hybrid automatic repeat request acknowledgement process, and priority of a physical uplink shared channel corresponding to the second hybrid automatic repeat request acknowledgement information is lower than priority of the high-priority physical uplink shared channel.

In yet another example, the second hybrid automatic repeat request acknowledgement information is a set default value.

In yet another example, the other uplink hybrid automatic repeat request acknowledgement process is uplink hybrid automatic repeat request acknowledgement process that is not fed back before the time domain resource of ending position of the high-priority physical uplink shared channel is received by the network device.

In yet another example, the transmission unit is further configured to retransmit the high-priority physical uplink shared channel by means of a configured grant physical uplink shared channel in response to not receiving downlink feedback information in the first available downlink control information monitoring occasion or the first duration and the terminal being configured with the configured grant physical uplink shared channel.

According to an aspect of the disclosure, provided is an unlicensed frequency band feedback apparatus, including:
a processor; and a memory configured to store an instruction executable by the processor;
where the processor is configured to execute the unlicensed frequency band feedback method of the first aspect or any one of the examples of the first aspect.

According to an aspect of the disclosure, provided is an unlicensed frequency band feedback apparatus, including:
a processor; and a memory configured to store an instruction executable by the processor;
where the processor is configured to execute the unlicensed frequency band feedback method of the second aspect or any one of the examples of the second aspect.

According to an aspect of the disclosure, provided is a non-transitory computer-readable storage medium. When an instruction in the storage medium is executed by a processor of a network device, the network device may execute the unlicensed frequency band feedback method of the first aspect or any one of the examples of the first aspect.

According to an aspect of the disclosure, provided is a non-transitory computer-readable storage medium. When an instruction in the storage medium is executed by a processor of a mobile terminal, the mobile terminal may perform the unlicensed frequency band feedback method of the second aspect or any one of the examples of the second aspect.

The technical solution provided in the examples of the disclosure may have the beneficial effects: a high-priority physical uplink shared channel is received, and downlink feedback information is transmitted. The downlink feedback information is used for feeding back the hybrid automatic repeat request acknowledgement information for the high-priority physical uplink shared channel, so as to achieve feedback of the feedback information of the high-priority physical uplink shared channel.

What is claimed is:

1. An unlicensed frequency band feedback method, comprising:
determining, by a network device, that a high-priority physical uplink shared channel is received; and
transmitting, by the network device, downlink feedback information to a terminal, wherein the downlink feedback information feeds back hybrid automatic repeat request acknowledgement information for the high-priority physical uplink shared channel;
wherein transmitting the downlink feedback information comprises:
transmitting the downlink feedback information at a first available downlink control information monitoring occasion after a time domain resource of ending position of the high-priority physical uplink shared channel, wherein the first available downlink control information monitoring occasion is one of a plurality of available downlink control information monitoring occasions, each available downlink control information monitoring occasion is a downlink control information monitoring occasion configured to monitor the downlink feedback information, and an interval between a time domain resource starting position corresponding to the first available downlink control information monitoring occasion and the time domain resource of the ending position of the high-priority physical uplink shared channel is greater than or equal to a first duration;
wherein the unlicensed frequency band feedback method further comprises:

receiving, by the network device, the high-priority physical uplink shared channel retransmitted, in response to the terminal not receiving the downlink feedback information in the first available downlink control information monitoring occasion or the first duration and the terminal being configured with a configured grant physical uplink shared channel, by the terminal through the configured grant physical uplink shared channel.

2. The unlicensed frequency band feedback method according to claim 1, wherein the first duration is agreed by a protocol, indicated by the network device via higher-layer signaling, or determined by negotiation between the network device and the terminal.

3. The unlicensed frequency band feedback method according to claim 1, wherein transmitting the downlink feedback information comprises:
   transmitting the downlink feedback information in a second duration after the time domain resource of the ending position of the high-priority physical uplink shared channel.

4. The unlicensed frequency band feedback method according to claim 1, wherein
   the downlink feedback information is further used for feeding back second hybrid automatic repeat request acknowledgement information corresponding to other uplink hybrid automatic repeat request acknowledgement process; and
   priority of a physical uplink shared channel corresponding to the second hybrid automatic repeat request acknowledgement information is lower than priority of the high-priority physical uplink shared channel.

5. The unlicensed frequency band feedback method according to claim 4, wherein the second hybrid automatic repeat request acknowledgement information is a set default value.

6. The unlicensed frequency band feedback method according to claim 4, wherein the other uplink hybrid automatic repeat request acknowledgement process is uplink hybrid automatic repeat request acknowledgement process that is not fed back before the time domain resource of the ending position of the high-priority physical uplink shared channel is received.

7. An unlicensed frequency band feedback apparatus, comprising:
   one or more processors, and
   a memory configured to store an instruction executable by the one or more processors,
   wherein the one or more processors are collectively configured to execute the unlicensed frequency band feedback method of claim 1.

8. An unlicensed frequency band feedback method, comprising:
   transmitting, by a terminal, a high-priority physical uplink shared channel; and
   receiving, by the terminal, downlink feedback information that feeds back hybrid automatic repeat request acknowledgement information for the high-priority physical uplink shared channel;
   wherein receiving the downlink feedback information comprises:
   receiving the downlink feedback information at a first available downlink control information monitoring occasion after a time domain resource of ending position of the high-priority physical uplink shared channel, wherein the first available downlink control information monitoring occasion is one of a plurality of available downlink control information monitoring occasions, each available downlink control information monitoring occasion is a downlink control information monitoring occasion configured to monitor the downlink feedback information, and an interval between a time domain resource starting position corresponding to the first available downlink control information monitoring occasion and the time domain resource of the ending position of the high-priority physical uplink shared channel is greater than or equal to a first duration;
   wherein the unlicensed frequency band feedback method further comprises:
   retransmitting, by the terminal, the high-priority physical uplink shared channel through a configured grant physical uplink shared channel in response to the terminal not receiving the downlink feedback information in the first available downlink control information monitoring occasion or the first duration and the terminal being configured with the configured grant physical uplink shared channel.

9. The unlicensed frequency band feedback method according to claim 8, wherein the first duration is agreed by a protocol, indicated by a network device via higher-layer signaling, or determined by negotiation between the network device and the terminal.

10. The unlicensed frequency band feedback method according to claim 8, wherein receiving the downlink feedback information comprises:
    receiving the downlink feedback information in a second duration after the time domain resource of the ending position of the high-priority physical uplink shared channel.

11. The unlicensed frequency band feedback method according to claim 8, wherein
    the downlink feedback information is further used for feeding back second hybrid automatic repeat request acknowledgement information corresponding to other uplink hybrid automatic repeat request acknowledgement process; and
    priority of a physical uplink shared channel corresponding to the second hybrid automatic repeat request acknowledgement information is lower than priority of the high-priority physical uplink shared channel.

12. The unlicensed frequency band feedback method according to claim 11, wherein the second hybrid automatic repeat request acknowledgement information is a set default value.

13. The unlicensed frequency band feedback method according to claim 11, wherein the other uplink hybrid automatic repeat request acknowledgement process is uplink hybrid automatic repeat request acknowledgement process that is not fed back before the time domain resource of the ending position of the high-priority physical uplink shared channel is received by a network device.

14. An unlicensed frequency band feedback apparatus, comprising:
    one or more processors, and
    a memory configured to store an instruction executable by the one or more processors,
    wherein the one or more processors are collectively configured to:
    transmit a high-priority physical uplink shared channel; and
    receive downlink feedback information that feeds back hybrid automatic repeat request acknowledgement information for the high-priority physical uplink shared channel;

wherein the one or more processors are collectively configured to:

receive the downlink feedback information at a first available downlink control information monitoring occasion after a time domain resource of ending position of the high-priority physical uplink shared channel, wherein the first available downlink control information monitoring occasion is one of a plurality of available downlink control information monitoring occasions, each available downlink control information monitoring occasion is a downlink control information monitoring occasion configured to monitor the downlink feedback information, and an interval between a time domain resource starting position corresponding to the first available downlink control information monitoring occasion and the time domain resource of the ending position of the high-priority physical uplink shared channel is greater than or equal to a first duration;

wherein the one or more processors are further collectively configured to:

retransmit the high-priority physical uplink shared channel though a configured grant physical uplink shared channel in response to not receiving the downlink feedback information in the first available downlink control information monitoring occasion or the first duration and being configured with the configured grant physical uplink shared channel.

\* \* \* \* \*